(No Model.)
C. BROWN.
NUT LOCK.
No. 424,457. Patented Apr. 1, 1890.
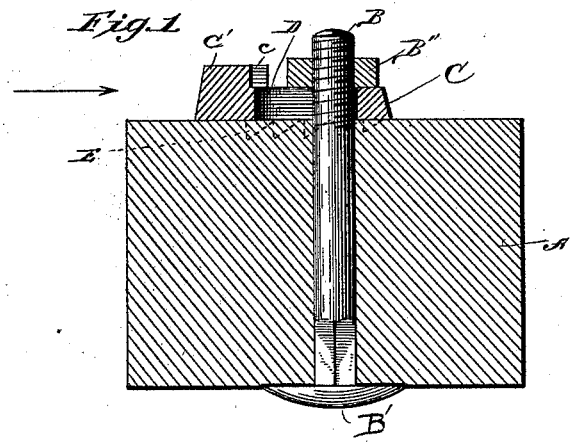
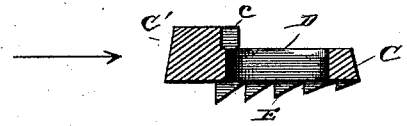
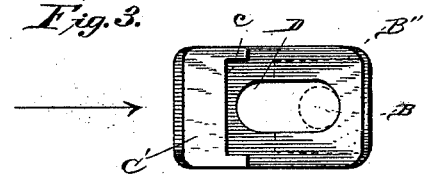
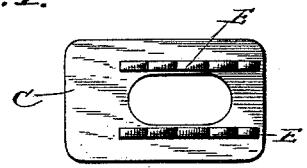
Witnesses.
Harry S. Rohrer
Will T. Norton
Inventor
Clark Brown
By
Niles & Greene,
Attys.

UNITED STATES PATENT OFFICE.

CLARK BROWN, OF FREEPORT, ILLINOIS.

NUT-LOCK.

SPECIFICATION forming part of Letters Patent No. 424,457, dated April 1, 1890.

Application filed July 6, 1889. Serial No. 316,657. (No model.)

*To all whom it may concern:*

Be it known that I, CLARK BROWN, a resident of Freeport, in the county of Stephenson and State of Illinois, have invented certain new and useful Improvements in Nut-Locks; and I do hereby declare the following to be a full, clear, and exact description of the invention, such as will enable others skilled in the art to which it pertains to make and use the same.

My invention relates to improvements in nut-locks adapted to prevent the accidental rotation of nuts on bolts inserted in woodwork.

The invention is fully described and explained in this specification, and shown in the accompanying drawings, in which—

Figure 1 is a central longitudinal section of my improved nut-lock in operative combination with a nut and a bolt passing through a bar of wood. Fig. 2 is a corresponding view of the washer or lock detached from the bolt and nut. Fig. 3 is a top plan of the washer. Fig. 4 is a bottom plan thereof.

In the illustrations, A is a bar or block of wood, and B a common bolt passed through the same and provided at one end with a head B' and at the other end with a nut B'', engaging the bolt in the ordinary manner. Between the nut and the block is interposed a washer or lock C, of any desired outline, provided with an elongated hole or slot D, through which the bolt passes. One end of the lock or washer C is raised above the remainder of its surface, and the raised portion C' has on its inner face a recess $c$ of such width as to receive one side of the nut B''. On the lower face of the lock C are formed two flanges E parallel with each other and with the longer axis of the opening D, and these flanges are preferably formed with saw-teeth, each of which has an abrupt or vertical edge at the end nearest the raised portion C' of the lock. It is evident that if the bolt be passed through the block A and through the slot in the washer C at the end farthest from the raised portion C' of the washer the nut B'' may be applied to the bolt and rotate thereon without striking the raised portion of the washer. As the nut is drawn down on the bolt it necessarily presses the flanges E of the washer into the wood of the block through which the bolt passes, and a sufficient tightening of the nut must bring the lower surface of the washer into perfect contact with the surface of the wood, the flanges E being sunk completely into the block.

The parts being in the position described, which is that shown in Fig. 1, the lock may be driven in the direction indicated by the arrow in each of the Figs. 1, 2, and 3 until the recess $c$ in the raised portion of the washer receives the edge of the nut and locks it against rotation. The beveled faces of the teeth on the flanges E offer but very little resistance to the movement of the washer in the direction indicated, and, in fact, the washer may be driven in either direction by the application of sufficient force; but when the washer has been driven into such a position as to lock the nut the abrupt faces of the saw-teeth on the flanges prevent accidental reverse movement of the washer, such as would be sufficient to release the nut. The washer therefore locks the nut securely against any accidental rotation, though it may be driven back to the potion shown in Fig. 1 by the use of an ordinary hammer and the application of a moderate amount of force.

The lock thus described and shown is very simple in construction and quite inexpensive, and at the same time is perfectly efficacious in its operation as a lock for the nuts of bolts set in wood-work.

Having now described my invention and explained its operation, what I claim as new, and desire to secure by Letters Patent, is—

1. As a nut-lock, a washer longitudinally slotted for the passage of the bolt, provided at one end of its upper face with a raised portion notched to receive a portion of the nut and having upon its lower face a flange parallel to the slot, gradually increasing in projection from the opposite end toward the end bearing the raised portion and terminating at its wider end in an abrupt or vertical face, whereby the washer may be easily driven in one direction to lock the nut, but may more strongly resist contrary motion.

2. The nut-locking washer formed with the elongated central opening for the bolt, having at one end of its upper face the raised portion recessed to receive a portion of the nut and provided upon its lower surface with the flange parallel to said opening, gradually increasing in projection as it approaches the end bearing the raised portion and notched to form teeth presenting a gradual incline toward the narrow end of the flange and an abrupt face upon the opposite side, whereby the washer may be easily driven in one direction, locking the nut, but may strongly resist contrary motion by independent and successively deeper engagement of said teeth.

In testimony whereof I have signed this specification in the presence of two subscribing witnesses.

CLARK BROWN.

Witnesses:
R. H. WILES,
M. STORKOPF.